US009768937B2

(12) United States Patent
Guan et al.

(10) Patent No.: US 9,768,937 B2
(45) Date of Patent: Sep. 19, 2017

(54) METHOD AND APPARATUS FOR ALLOCATING RESOURCES AND PROCESSING CONFIRMATION INFORMATION

(71) Applicant: Huawei Technologies Co., Ltd., Shenzhen (CN)

(72) Inventors: Lei Guan, Beijing (CN); Lixia Xue, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/130,678

(22) Filed: Apr. 15, 2016

(65) Prior Publication Data

US 2016/0352490 A1    Dec. 1, 2016

Related U.S. Application Data

(63) Continuation of application No. 14/951,059, filed on Nov. 24, 2015, now Pat. No. 9,345,005, which is a
(Continued)

(30) Foreign Application Priority Data

Jan. 24, 2009   (CN) .......................... 2009 1 0105293
Apr. 14, 2009   (CN) .......................... 2009 1 0130084

(51) Int. Cl.
*H04L 5/00*    (2006.01)
*H04L 1/18*    (2006.01)
(Continued)

(52) U.S. Cl.
CPC .......... *H04L 5/0055* (2013.01); *H04L 1/1607* (2013.01); *H04L 1/1854* (2013.01);
(Continued)

(58) Field of Classification Search
CPC .... H04L 1/1854; H04L 1/1896; H04L 1/1861
See application file for complete search history.

(56) References Cited

U.S. PATENT DOCUMENTS

2004/0146067 A1   7/2004   Yi et al.
2005/0272432 A1  12/2005   Ji et al.
(Continued)

FOREIGN PATENT DOCUMENTS

CN   101052196 A    10/2007
CN   101183920 A     5/2008
(Continued)

OTHER PUBLICATIONS

3GPP TSG RAN WG1 Meeting #54, R1-082999, "Support of UL/DL asymmetric carrier aggregation," Aug. 18-22, 2008, 3GPP.*
(Continued)

*Primary Examiner* — Jae Y Lee
(74) *Attorney, Agent, or Firm* — Huawei Technologies Co., Ltd.

(57) ABSTRACT

A method and an apparatus for allocating ACKnowledgement (ACK)/Non-ACKnowledgement (NACK) channel resources and processing confirmation information are disclosed. The method includes: The network side determines one physical channel area among multiple physical channel areas to be used by an ACK/NACK channel, and notifies the determined physical channel area to a User Equipment (UE) so as to enable the UE to determine a channel for receiving or sending ACK/NACK information in the determined physical channel area according to a mapping rule. Moreover, the network side may send or receive ACK/NACK information on the physical channel area that includes the ACK/NACK channel. The method and apparatus improve
(Continued)

the utilization ratio and flexibility of the ACK/NACK channel, and reduce the probability of conflict generated by the ACK/NACK channel.

14 Claims, 9 Drawing Sheets

Related U.S. Application Data continuation of application No. 13/145,984, filed as application No. PCT/CN2010/070352 on Jan. 25, 2010, now Pat. No. 9,219,580.

(51) Int. Cl.
  *H04L 1/16* (2006.01)
  *H04W 72/04* (2009.01)
(52) U.S. Cl.
  CPC .......... *H04L 1/1861* (2013.01); *H04L 1/1896* (2013.01); *H04W 72/042* (2013.01); *H04W 72/0406* (2013.01); *H04W 72/0413* (2013.01); *H04W 72/0466* (2013.01)

(56) References Cited

U.S. PATENT DOCUMENTS

| | | | |
|---|---|---|---|
| 2007/0047502 A1 | 3/2007 | Marinier et al. | |
| 2007/0211667 A1 | 9/2007 | Agrawal et al. | |
| 2008/0101211 A1 | 5/2008 | Rao | |
| 2008/0273513 A1 | 11/2008 | Montojo et al. | |
| 2009/0010198 A1 | 1/2009 | Boariu et al. | |
| 2009/0257449 A1 | 10/2009 | Chen et al. | |
| 2009/0257499 A1 | 10/2009 | Karczewicz et al. | |
| 2010/0098012 A1 | 4/2010 | Bala et al. | |
| 2010/0118800 A1 | 5/2010 | Kim et al. | |
| 2010/0172290 A1* | 7/2010 | Nam | H04L 1/1854 370/328 |
| 2010/0296473 A1 | 11/2010 | Kim et al. | |
| 2011/0194500 A1 | 8/2011 | Kim et al. | |
| 2011/0299489 A1 | 12/2011 | Kim et al. | |

FOREIGN PATENT DOCUMENTS

| | | |
|---|---|---|
| CN | 101540632 A | 9/2009 |
| CN | 101651523 A | 2/2010 |
| CN | 101790240 B | 4/2015 |
| EP | 1959706 A2 | 8/2008 |
| RU | 2004125647 A | 4/2005 |
| RU | 2280327 C2 | 7/2006 |
| RU | 2006147238 A | 7/2008 |
| WO | WO 2004042952 A1 | 5/2004 |
| WO | WO 2005125262 A1 | 12/2005 |
| WO | WO 2008092160 A2 | 7/2008 |
| WO | WO 2008153367 A1 | 12/2008 |
| WO | WO 2009115044 A1 | 9/2009 |

OTHER PUBLICATIONS

1$^{st}$ Office Action in corresponding U.S. Appl. No. 13/145,984 (Jun. 11, 2013).
3$^{rd}$ Office Action in corresponding U.S. Appl. No. 13/145,984 (Dec. 20, 2013).
1$^{st}$ Office Action in corresponding U.S. Appl. No. 13/145,984 (Jan. 21, 2015).
"PHICH Mapping in Asymmetric Carrier Aggregation," 3GPP TSG RAN WG1 Meeting #55b, R1-090098, Ljublijana, Slovenia (Jan. 12-16, 2009).
"3$^{rd}$ Generation Partnership Project; Technical Specification Group Radio Access Network; Evolved Universal Terrestrial Radio Access (E-UTRA); Physical Layer Procedures (Release 8)," 3GPP TS 36.213, V8.5.0, pp. 1-74, 3$^{rd}$ Generation Partnership Project, Valbonne, France (Dec. 2008).
"3$^{rd}$ Generation Partnership Project; Technical Specification Group Radio Access Network; Evolved Universal Terrestrial Radio Access (E-UTRA); Physical Channels and Modulation (Release 8)," 3GPP TS 36.211, V8.5.0, pp. 1-82, 3$^{rd}$ Generation Partnership Project, Valbonne, France (Dec. 2008).
"Support of UL/DL asymmetric carrier aggregation," 3GPP TSG RAN WG1 Meeting #54, R1-082999 (Aug. 18-22, 2008).
U.S. Appl. No. 14/951,059, filed Nov. 24, 2015.
U.S. Appl. No. 13/145,984, filed Jul. 22, 2011.
"3$^{rd}$ Generation Partnership Project; Technical Specification Group Radio Access Network; Evolved Universal Terrestrial Radio Access (E-UTRA); Multiplexing and channel coding (Release 8)," 3GPP TS 36.211, V8.5.0, pp. 1-58, 3$^{rd}$ Generation Partnership Project, Valbonne, France (Dec. 2008).

\* cited by examiner

METHOD AND APPARATUS FOR ALLOCATING RESOURCES AND PROCESSING CONFIRMATION INFORMATION

CROSS-REFERENCE TO RELATED APPLICATIONS

This application is a continuation of U.S. patent application Ser. No. 14/951,059, filed on Nov. 24, 2015. The U.S. patent application Ser. No. 14/951,059 is a continuation of U.S. patent application Ser. No. 13/145,984, filed on Jul. 22, 2011 and issued on Dec. 22, 2015 as U.S. Pat. No. 9,219, 580, which is a National Stage of International Patent Application No. PCT/CN2010/070352, filed on Jan. 25, 2010, which claims priority to Chinese Patent Application No. 200910105293.9, filed on Jan. 24, 2009, and Chinese Patent Application No. 200910130084.X, filed on Apr. 14, 2009. The afore-mentioned patent applications are hereby incorporated by reference in their entireties.

FIELD OF THE INVENTION

The present invention relates to communications technologies, and in particular, to a technology of allocating resources and processing confirmation information.

BACKGROUND OF THE INVENTION

In a communication system, carrier aggregation is applied to support wider bandwidth and accomplish the peak value rate. In the carrier aggregation technology, multiple branch carriers are aggregated to support wideband transmission. Every branch carrier is backward-compatible. Depending on capabilities of User Equipment (UE), the UE can receive or send signals of multiple carriers simultaneously.

The communication between the UE and the Base Station (BS) is generally based on a Hybrid Automatic Repeat Request (HARD) technology in the process of sending/receiving data of each branch carrier. That is, the data of a transmission block is code-modulated and sent; after the receiver receives the data, if the data passes the Cyclical Redundancy Check (CRC), the receiver regards the decoding as correct and returns an ACKnowledgement (ACK) message; if the data fails the CRC, the receiver regards the decoding as incorrect, and returns a Non-ACKnowledgement (NACK) message. The ACK message and the NACK message are collectively known as confirmation messages, and the transmitter performs further operations such as HARQ according to the received confirmation message.

In the sending or receiving of the data of multiple carriers, an independent HARQ process of each carrier is applied. For example, data may be sent over a physical shared channel, and control information may be sent over a physical control channel. Physical Downlink Control Channel (PDCCH) is made up of Control Channel Elements (CCEs). A physical control channel is generally made up of 1, 2, 4, or 8 CCEs. When multiple carriers exist, each carrier has an independent HARQ process so that confirmation information may need to be sent by multiple Physical Uplink Control Channels (PUCCHs).

In the case of a single carrier, the resources for the uplink carrier to feed back the ACK/NACK are reserved according to the maximum number of CCEs on the corresponding downlink carrier.

In the case that the carrier aggregation scheme is aggregation of paired carriers, namely, the number of uplink carriers is equal to the number of downlink carriers, the single-carrier rule is still applicable to reserving and mapping of the ACK/NACK channel resources. However, in the case that the carrier aggregation scheme is aggregation of paired carriers, especially aggregation of UE-specific non-paired carriers, the single-carrier rule is no longer applicable to reserving and mapping of the ACK/NACK channel resources. Because the corresponding feedback channel is uncertain, it is impossible to feed back the ACK/NACK messages corresponding to non-paired downlink carriers or uplink carriers.

SUMMARY OF THE INVENTION

The embodiments of the present invention provide a method and an apparatus for allocating resources and processing confirmation information to determine locations of sending or receiving ACK/NACK channels.

A method for allocating ACK/NACK channel resources includes:

determining one physical channel area among multiple physical channel areas to be used by an ACK/NACK channel, and notifying the determined physical channel area to a UE through signaling so as to enable the UE to determine a channel for receiving or sending ACK/NACK information in the determined physical channel area according to a mapping rule.

An apparatus for allocating ACK/NACK channel resources includes:

a physical channel area determining module, configured to determine one physical channel area among multiple physical channel areas to be used by an ACK/NACK channel; and a notifying module, configured to notify the determined physical channel area to a UE through signaling so that the UE can determine a channel for receiving or sending ACK/NACK information in the determined physical channel area according to a mapping rule.

A method for processing confirmation information includes:

obtaining a physical channel area indication which indicates a physical channel area that includes an ACK/NACK channel among multiple physical channel areas; and sending or receiving ACK/NACK information in the physical channel area that includes the ACK/NACK channel according to the physical channel area indication.

An apparatus for processing confirmation information includes:

a physical channel area obtaining module, configured to obtain a physical channel area indication which indicates a physical channel area that includes an ACK/NACK channel among multiple physical channel areas; and a confirmation information processing module, configured to send or receive ACK/NACK messages on the physical channel area that includes the ACK/NACK channel according to the physical channel area indication obtained by the physical channel area obtaining module.

In the embodiments of the present invention, one physical channel area is determined in multiple physical channel areas, and the location of the ACK/NACK channel is determined on this physical channel area according to the mapping rule. In this way, the ACK/NACK channels can be scheduled flexibly, and therefore the ACK/NACK corresponding to non-paired uplink carriers or non-paired downlink carriers can be fed back.

BRIEF DESCRIPTION OF THE DRAWINGS

To describe the technical solution under the present invention more clearly, the following describes the accompanying drawings involved in the embodiments of the present invention. Apparently, the accompanying drawings described below are not exhaustive, and persons of ordinary skill in the art can derive other drawings from such accompanying drawings without any creative effort.

DETAILED DESCRIPTION OF THE EMBODIMENTS

The following detailed description is provided in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments provided herein without any creative effort, shall fall within the protection scope of the present invention.

To make the technical solution, objectives and merits of the present invention clearer, the following describes the embodiments of the present invention in more detail with reference to the accompanying drawings.

Figure 1:
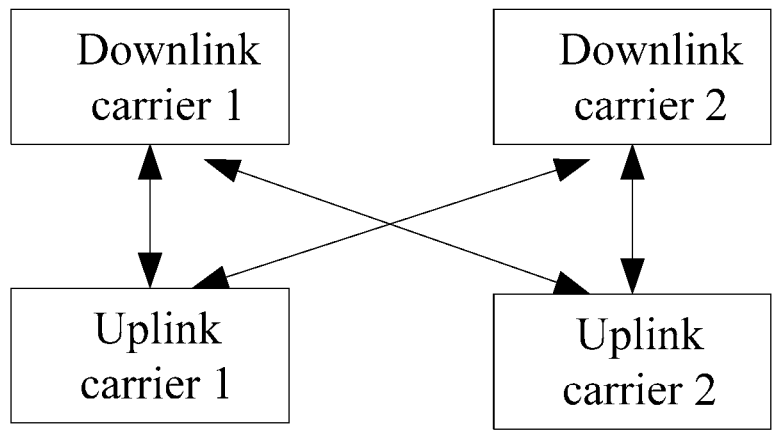
FIG. 1 shows how to determine carriers in an embodiment of the present invention.

Non-paired uplink carriers or non-paired downlink carriers have no corresponding paired carriers for feeding back ACK/NACK messages. Therefore, resources may be added into the paired carriers to enable feedback of confirmation information of non-paired carriers. For example, as shown in FIG. 1, a User 1 uses downlink carrier 1, downlink carrier 2, and uplink carrier 1. Uplink carrier 1 is paired with downlink carrier 1, and the corresponding resource may be added on uplink carrier 1 as a feedback area of downlink carrier 2 (non-paired downlink carrier). That is, the paired downlink carrier feeds back information in the legacy feedback area of the corresponding uplink carrier, and the non-paired downlink carrier feeds back information in a newly added area of the paired uplink carrier. For non-paired uplink carriers, the foregoing method serves as a reference.

The foregoing method enables feedback of ACK/NACK messages of non-paired uplink carriers or non-paired downlink carriers. However, because the feedback area is fixed, if many resources are unused in the legacy feedback area, resource waste may occur, and it is impossible to schedule ACK/NACK resources flexibly.

In this embodiment and the following embodiments, the confirmation information indicates whether a receiver receives transmission content from a transmitter correctly. For ease of description, ACK indicates that the content is received correctly, and NACK indicates that the content is received incorrectly. ACK and NACK are only examples of confirmation messages. In practice, other confirmation messages may be applied instead. The corresponding confirmation information channel resource is a resource for transmitting confirmation messages. In the following embodiments, the ACK/NACK channel resource is taken as an example of a resource of the corresponding confirmation information channel.

In the channel resource allocation scheme provided in this embodiment, one physical channel area may be determined among multiple physical channel areas to be used by the ACK/NACK channel on the network side, and then information about the determined physical channel area is notified to the UE by signaling. In this way, the UE can determine the channel for sending or receiving ACK/NACK information in a corresponding physical channel area according to a mapping rule, and the ACK/NACK information can be sent or received on the physical channel of the physical channel area.

For example, the corresponding physical channel area may be a legacy area or current area. The legacy area is designed for feeding back confirmation information in a legacy system, and the current area is designed for feeding back confirmation information in a current system compatible with the legacy system. Specifically, the legacy area and the current area may respectively be LTE areas and LTE-A-specific areas; or the legacy area and the current area may respectively be Coordinated Multi-Point (CoMP) areas and non-CoMP areas, where the CoMP areas are used by CoMP users exclusively for sending ACK/NACK information, and the ACK/NACK information sent in the CoMP area may be modulated through the sequences specific to CoMP users; or, the legacy area and the current area may respectively be non-relay areas and relay areas, where the relay areas are used by relay stations for receiving and sending ACK/NACK; or, the legacy area and the current area may be categorized into other physical channel areas. Each area may further include one or more subareas. For example, an LTE-A-specific area may include one or more LTE-A-specific subareas.

In this embodiment, multiple physical channel areas do not overlap at all, or overlap partly. For example, the legacy area may be orthogonal to the current area (namely, without overlap), or may overlap with the current area.

In this embodiment, more than one physical channel area needs to be configured or divided on the network side. At least one of the physical channel areas is designed for feeding back confirmation information of paired carriers, and at least one of the physical channel areas is designed for feeding back confirmation information of non-paired carriers. In the foregoing description, a legacy area is taken as an example of the at least one physical channel area for feeding back confirmation information of paired carriers, and a current area is taken as an example of the at least one physical channel area for feeding back confirmation information of non-paired carriers. In the following embodiments, for ease of description, a physical channel area for feeding back confirmation information of paired carriers is called a first physical channel area; and a physical channel area for feeding back confirmation information of non-paired carriers is called a second physical channel area.

The LTE-A-specific areas may further include ACK/NACK channels corresponding to CCEs in the public search space in the LTE system, namely, the first 16 ACK/NACK channels of the ACK/NACK channel resources of the LTE, so as to improve utilization ratio of an ACK/NACK channel. The foregoing physical channel areas may be placed on one or more carriers, and a physical channel area may be set on one carrier or multiple carriers. In the following embodiments, the setting of the physical channel areas is the same and therefore not described again.

Figure 2:
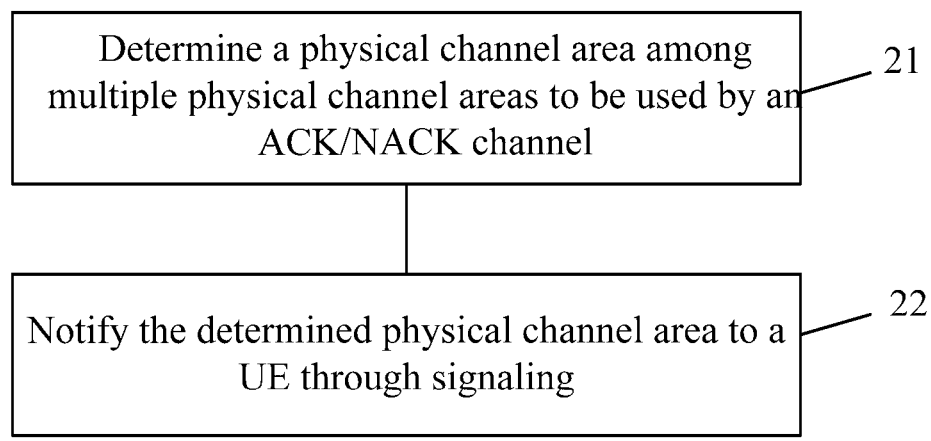
FIG. 2 shows a process of allocating ACK/NACK channel resources in an embodiment of the present invention.

The following provides more details about the process of allocating ACK/NACK channel resources in an embodiment of the present invention. As shown in FIG. 2, the process may include:

Step 21: A network side (such as a BS) determines a physical channel area among multiple physical channel areas to be used by an ACK/NACK channel.

The determined physical channel area may be an uplink physical channel area to be used by an uplink ACK/NACK channel, or a downlink physical channel area to be used by a downlink ACK/NACK channel. That is, this step is applicable to both an uplink scenario and a downlink scenario.

In the process of selecting a physical channel area in multiple physical channel areas, taking the LTE system and LTE-A system as an example, the selection may include: When the channel redundancy of the LTE area is great, for example, the PDCCH has a high CCE level or low load on the paired downlink carriers, and the ACK/NACK mapping of the paired carriers of the current user does not conflict, it is determined that the current user uses the LTE area for ACK/NACK channel mapping, and the user is notified through signaling; when the channel redundancy of the LTE area is small, for example, the PDCCH has a low CCE level or high load on the paired downlink carriers, and the ACK/NACK mapping of the non-paired carriers of the current user does not conflict, it is determined that the current user uses the LTE-A-specific area for ACK/NACK channel mapping, and the user is notified through signaling; when the ACK/NACK mapping of the LTE area conflicts with the ACK/NACK mapping of the LTE-A-specific area of the non-paired carriers of the user, the scheduling for the current user is disabled.

Step 22: Notify the determined physical channel area to a UE through signaling.

Specifically, the physical channel area that includes the ACK/NACK channel may be notified to the UE dynamically through bits or a scrambling code. That is: one or more bits are used to indicate the physical channel area in which the user side receives or sends ACK/NACK information, and the one or more bits are sent to the UE through signaling. For example, in a Physical Downlink Control Channel, one bit represents two states (corresponding to two different physical channel area identifiers); and two bits represent four states (corresponding to four different physical channel area identifiers). In this way, the physical channel area of the ACK/NACK channel is notified to a user dynamically. After receiving the one bit or two bits, the user side can send or receive ACK/NACK information on the ACK/NACK channel included in the physical channel area corresponding to the one bit or two bits; or different scrambling codes are used to indicate the physical channel area in which the user side receives or sends ACK/NACK information, and the scrambling codes are sent to the UE through signaling.

In the foregoing processing, if one or more bits are used to indicate the physical channel area in which the user side receives or sends ACK/NACK information, new bits may be added into the PDCCH to indicate the physical channel area in which the user side receives or sends the ACK/NACK information; or all or part of the states represented by the existing bits in the PDCCH may be multiplexed to indicate the physical channel area in which the user side receives or sends ACK/NACK information. For example, three bits in the PDCCH represent an HARQ process, and all or part of the eight states represented by the three bits may be used to indicate the physical channel area in which the user side receives and sends ACK/NACK information.

Alternatively, the signaling for determining the physical channel area may be encoded together with other signaling in the physical control channel such as PDCCH.

For example, the signaling for determining the physical channel area may be encoded together with the ACK/NACK indication bits in the PDCCH. The ACK/NACK indication bit indicates the occupied ACK/NACK channel in physical control channels. For example, eight ACK/NACK channels are configured in a physical channel area, and an ACK/NACK indication with at least three bits may be used to indicate the ACK/NACK channel occupied by a user. New bits may be added in the physical control channel as ACK/NACK indication bits, or other bits in the physical control channel may be multiplexed as ACK/NACK indication bits. For example, the resource allocation granularity is increased so that the bits of the resource allocation field in the PDCCH are multiplexed as ACK/NACK indication bits. The physical channel area may be the first physical channel area, or, preferably, the second physical channel area.

One or more states represented by the ACK/NACK indication bits may be used to indicate the determined physical channel area to a UE. For example, when there are three ACK/NACK indication bits, 000 indicates that the determined physical channel area is the first physical channel area, and 001-111 indicate the 7 ACK/NACK channels in the second physical channel area respectively.

Specially, if many users, such as more than 8 users, are scheduled on the non-paired carriers simultaneously and confirmation information needs to be fed back, the ACK/NACK channels in the second physical channel area may be insufficient. In this case, the ACK/NACK indication bits may be encoded together with the signaling for determining the physical channel area, namely, one or more states of the ACK/NACK indication bits are used to indicate the determined physical channel area. In addition, the first physical channel area may employ an implicit mapping rule of CCE index. In this case, one or more states represented by the ACK/NACK indication bits are used to notify the current user, and a ACK/NACK channel of the user is mapped to the first physical channel area according to the implicit mapping rule of PDCCH CCE index.

In the case that the signaling for determining the physical channel area is multiplexed together with other signaling in the physical control channel, another instance is: the signaling for determining the physical channel area is encoded together with carrier indication bits. The carrier indication bits indicate the carrier scheduled by the current physical control channel. For example, in the case of four PDSCH carriers, at least two bits in the PDCCH need to be used as carrier indication bits to indicate which one of the four carriers is currently scheduled for the PDCCH.

If the carrier indication includes three bits and four PDSCH carriers exist currently, one bit or two states are redundant. In this case, the redundant bit or redundant states of the carrier indication bits may be used to indicate the determined physical channel area. In this scenario, both the first physical channel area and the second physical channel area may employ the implicit mapping rule of CCE index; or, the first physical channel area employs the implicit mapping rule of CCE index, and the second physical channel area uses the ACK/NACK indication bits to indicate the specific ACK/NACK channel; or, the first physical channel area uses the implicit mapping rule of CCE index, and the second physical channel area may be configured exclusively for the user indicated by the cross-carrier PDCCH through high-layer semi-static signaling.

The signaling for determining the physical channel area is encoded together with other signaling in the physical control channel, and the existing fields in the physical control channel may be used to indicate the determined physical channel area to a UE, which reduces conflict of the ACK/NACK channel, improves flexibility of scheduling and saves signaling overhead.

In embodiments of this invention, in the detailed process of notifying a UE, layer-1 signaling/layer-2 signaling (L1/L2 signaling) or Radio Resource Control (RRC) signaling may be used to send a corresponding notification. In this way, the determined physical channel area is notified to the UE.

In embodiments of this invention, the network may use RRC signaling to send the start offset information. The start offset information indicates the start position of the physical channel area for receiving or sending ACK/NACK information, for example, the start position of the LTE area, or the start position of the LTE-specific area (including the start position of an LTE-A-specific subarea). The start offset information is used for dividing physical channel areas. Therefore, the start offset information is not sent any more after being sent initially, or is sent at long regular intervals, or sent at long irregular intervals. The step of notifying the start offset information to the UE through RRC signaling may be performed before, during or after the foregoing step. After the foregoing step is performed, the step of sending the start offset information is not necessarily performed. Accordingly, the mapping rule may be: the start offset information is combined with the sequence number of the CCE to indicate the channel (namely, ACK/NACK channel) used by a specific user side to receive or send ACK/NACK information. Further, in the case that an LTE-A-specific area includes multiple LTE-A-specific subareas, the LTE-A-specific subareas may overlap partly or completely with one another, and a LTE-A-specific subarea may overlap with a LTE area of the LTE system partly or completely. Specifically, the corresponding start offset information may be applied so that multiple areas (LTE areas or LTE-A-specific subareas) overlap partly or completely.

In this embodiment, the configuring or allocation of physical channel areas may be performed once or repeatedly on the network side; and may be performed periodically or irregularly. After configuring or allocating the physical channel area, the network side needs to notify a UE, and the notification method is described above. Alternatively, if both the network side and a UE know the allocation of the physical channel area, it is not necessary to notify the UE through signaling, and the physical channel area known to the network side and the UE is applied.

Through the ACK/NACK channel resource allocation solution above, the network side can feed back ACK/NACK information corresponding to non-paired uplink carriers or non-paired downlink carriers, and can indicate the physical channel area that includes the ACK/NACK channel to the UE flexibly, which improves utilization ratio of the ACK/NACK channel resources and reduces overhead and possible conflicts. Through configuring or allocation of the physical channel area, the resources are utilized more efficiently and flexibly.

A method for processing confirmation information (namely, ACK/NACK information) is provided in an embodiment of the present invention. This method is implemented in a UE or a network side, as detailed below.

(I) Processing Confirmation Information in a UE

In a UE, the process of processing confirmation information may include: obtaining a physical channel area indication which indicates the physical channel area that includes the ACK/NACK channel in multiple physical channel areas; and the UE sends or receives ACK/NACK information on the physical channel area that includes the ACK/NACK channel according to the physical channel area indication.

The corresponding multiple physical channel areas are described above.

Figure 3:
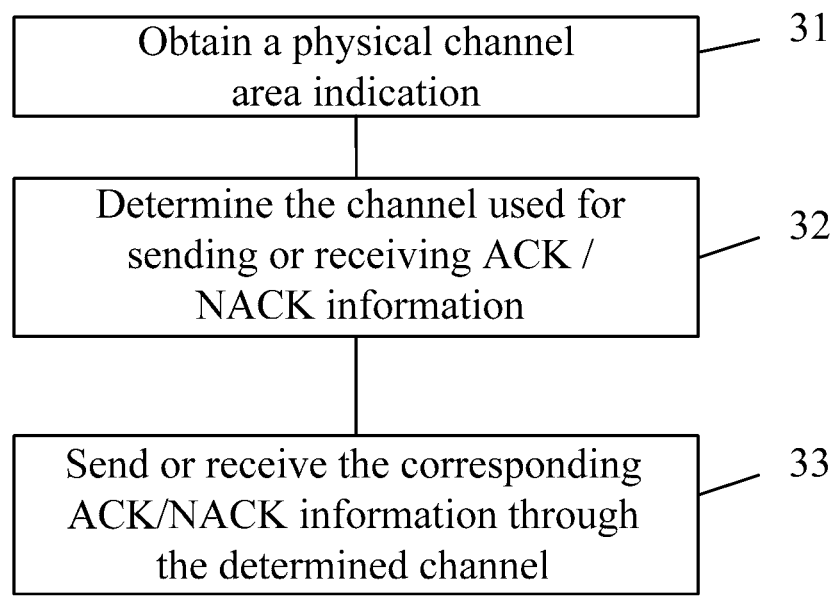
FIG. 3 shows a process of processing confirmation information in an embodiment of the present invention.

The following provides more details about the process of processing confirmation information in a UE in an embodiment of the present invention. As shown in FIG. 3, the process may include:

Step 31: Obtain a physical channel area indication.

In the process of receiving the physical channel area indication sent by the network side, a UE may use (but without being limited to using) one or more bits in the PDCCH to obtain the physical channel area indication for receiving or sending ACK/NACK information; or, the UE may use a scrambling code in the PDCCH to obtain the physical channel area indication for receiving or sending ACK/NACK information; or, the UE may use other high-layer signaling (such as RRC signaling) to receive and obtain the corresponding physical channel area indication information.

Step 32: Determine the channel used for sending or receiving ACK/NACK information.

Specifically, the channel used for sending or receiving ACK/NACK information is determined in the physical channel area indicated by the physical channel area indication according to a predefined mapping rule. That is, the ACK/NACK channel used in the UE for receiving or sending ACK/NACK information is determined according to the predefined mapping rule among multiple ACK/NACK channels included in the physical channel area used by the UE for receiving or sending ACK/NACK information, and therefore, the UE can determine the specific channel for receiving or sending ACK/NACK information in the physical channel area. The mapping rule is a principle of selecting a channel for sending or receiving ACK/NACK information in the physical channel area. For example, the mapping rule may be: The start offset information is combined with the CCE sequence number to indicate the channel used by the UE for receiving or sending ACK/NACK information. For example, a user 1 uses uplink carrier 1, downlink carrier 1, and downlink carrier 2; the start offset information is 16; the CCE sequence numbers that need to be fed back on downlink carrier 2 are 20, 21, 22, and 23; the minimum CCE sequence number is combined with the start offset information, and therefore, the ACK/NACK channel numbered 36 (20+16) in the corresponding physical channel area is selected for feedback.

Further, the channel used for receiving or sending ACK/NACK messages in multiple channels included in the different LTE-A-specific subareas or LTE areas according to different mapping rules.

In this embodiment, the mapping rule further includes: using the ACK/NACK channel indicated by the ACK/NACK indication bits.

Step 33: Send or receive the corresponding ACK/NACK information through the channel determined for sending or receiving ACK/NACK information.

In the foregoing process of processing confirmation information, the UE can know the channel used for sending or receiving ACK/NACK information, and receive or send ACK/NACK information accordingly. In this way, the ACK/NACK information corresponding to non-paired uplink carriers or non-paired downlink carriers can be fed back, and the ACK/NACK channels can be scheduled flexibly.

(II) Process of Processing Confirmation Information in the Network Side

In the network side, the process of processing confirmation information may include: The network side obtains locally a physical channel area indication information which indicates the physical channel area that includes the ACK/NACK channel in multiple physical channel areas; and the network side sends or receives ACK/NACK information on the physical channel area that includes the ACK/NACK channel according to the physical channel area indication information. The process of processing confirmation information in the network side may be implemented in a Base Station, namely, the Base Station obtains locally a physical channel area indication information for receiving or sending ACK/NACK information, and sends or receives the corresponding ACK/NACK information according to the physical channel area indication information.

While the network side sends or receives ACK/NACK information in the physical channel area that includes the ACK/NACK channel, the network side may perform the following operation additionally: determining the channel in the physical channel area used for receiving or sending ACK/NACK information. Specifically, the network side may determine the channel used for receiving or sending ACK/NACK information in multiple channels included in different LTE-A-specific subareas or LTE areas according to different mapping rules. The mapping rule is a principle of selecting a channel for sending or receiving ACK/NACK information in a physical channel area.

In the foregoing process of processing confirmation information, the network side can determine the channel used for sending or receiving ACK/NACK information, and send or receive ACK/NACK information accordingly.

This embodiment may include the following step additionally: A UE obtains the locations of the first physical channel area and the second physical channel area allocated by the network side. This step may be implemented by receiving start offset information. The UE may know the start point of each physical channel area in the multiple physical channel areas according to the start offset information, and determine the location of each physical channel area.

To facilitate the understanding of the embodiments of the invention, the following provides details about the implementation process of the embodiments of the present invention with reference to the accompanying drawings, assuming that the embodiments are applied in an LTE system and an LTE-A system.

Embodiment 1

The first embodiment deals with how the network side allocates ACK/NACK channel resources and receives or sends ACK/NACK information, and how a UE receives or sends ACK/NACK information.

(I) The Network Side Allocates ACK/NACK Channel Resources and Receives or Sends ACK/NACK Information (1) Multiple physical channel areas are configured in the network side.

In the detailed implementation process, a certain number of LTE-A-specific areas (which may include multiple LTE-A-specific subareas) may be introduced in order to reduce performance loss caused by ACK/NACK interference between cells and prevent increase of too much ACK/NACK resource overhead. The number of LTE-A-specific areas introduced may be configured through high-layer signaling.

Figure 4:
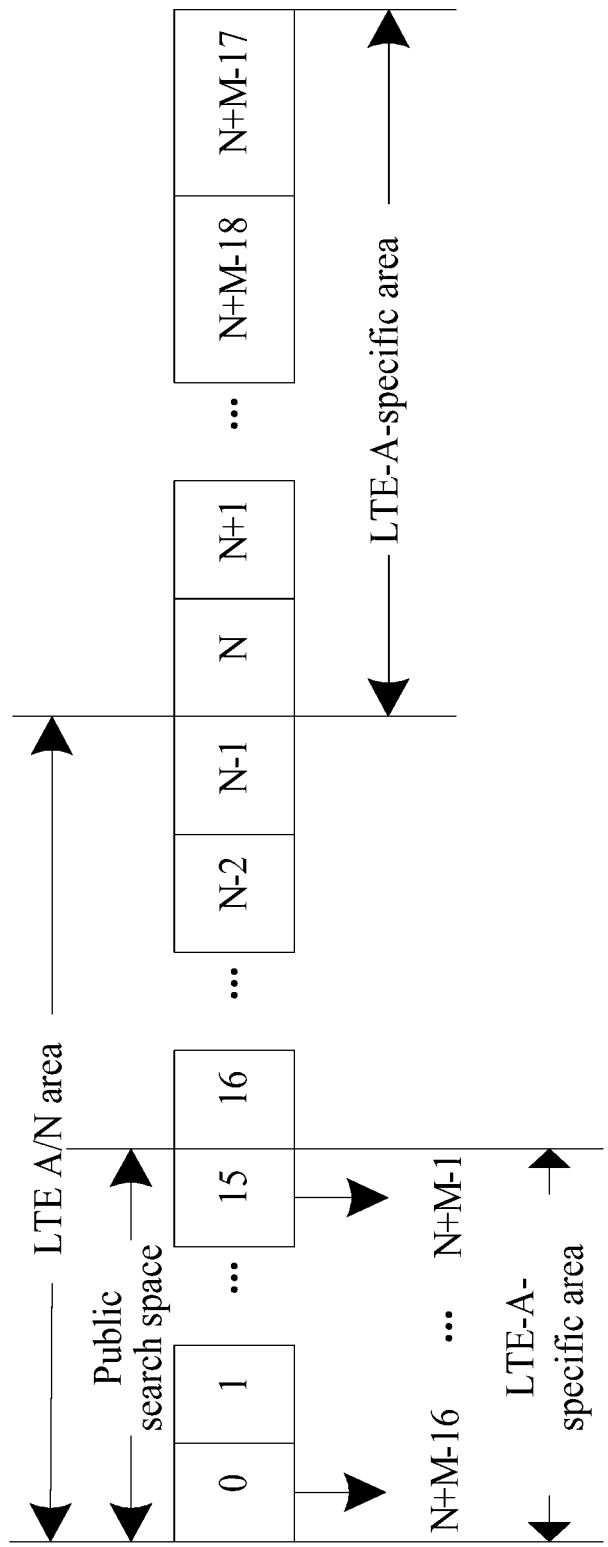
FIG. 4 shows an LTE-specific area in an embodiment of the present invention.

As shown in FIG. 4, the number of ACK/NACK channels in the LTE area is N (namely, ACK/NACK channels numbered from 0 to N−1). In the N channels, the first 16 ACK/NACK channels are numbered from 0 to 15, and the 16 ACK/NACK channels are the ACK/NACK channels corresponding to the CCE in the public search space. The number of ACK/NACK channels in the LTE-A-specific area is M. The LTE-A-specific area may include the first 16 ACK/NACK channels (numbered from 0 to 15) corresponding to the CCE of the public search space in the LTE area. For the users mapped to the ACK/NACK area of the LTE, the 16 ACK/NACK channels are numbered from 0 to 15; for the users mapped to the LTE-A-specific area, the 16 ACK/NACK channels are numbered from N+M−16 to N+M−1, which ensures that the number of ACK/NACK channels of the LTE-A-specific area is M.

(2) The physical channel areas for sending ACK/NACK information are allocated. Specifically, the physical channel areas for sending ACK/NACK information are allocated to the network side, and the physical channel areas for sending ACK/NACK information are allocated to a UE.

As shown in FIG. 4, in the process of allocating physical channel areas, the ACK/NACK channel corresponding to non-paired downlink carriers may be mapped to the configured LTE-A-specific area (which includes multiple LTE-A-specific subareas); and the ACK/NACK channel corresponding to paired downlink carriers is still mapped to the physical channel area (LTE area) reserved by the LTE system for sending or receiving ACK/NACK information according to the rule of the LTE system.

Figure 5:
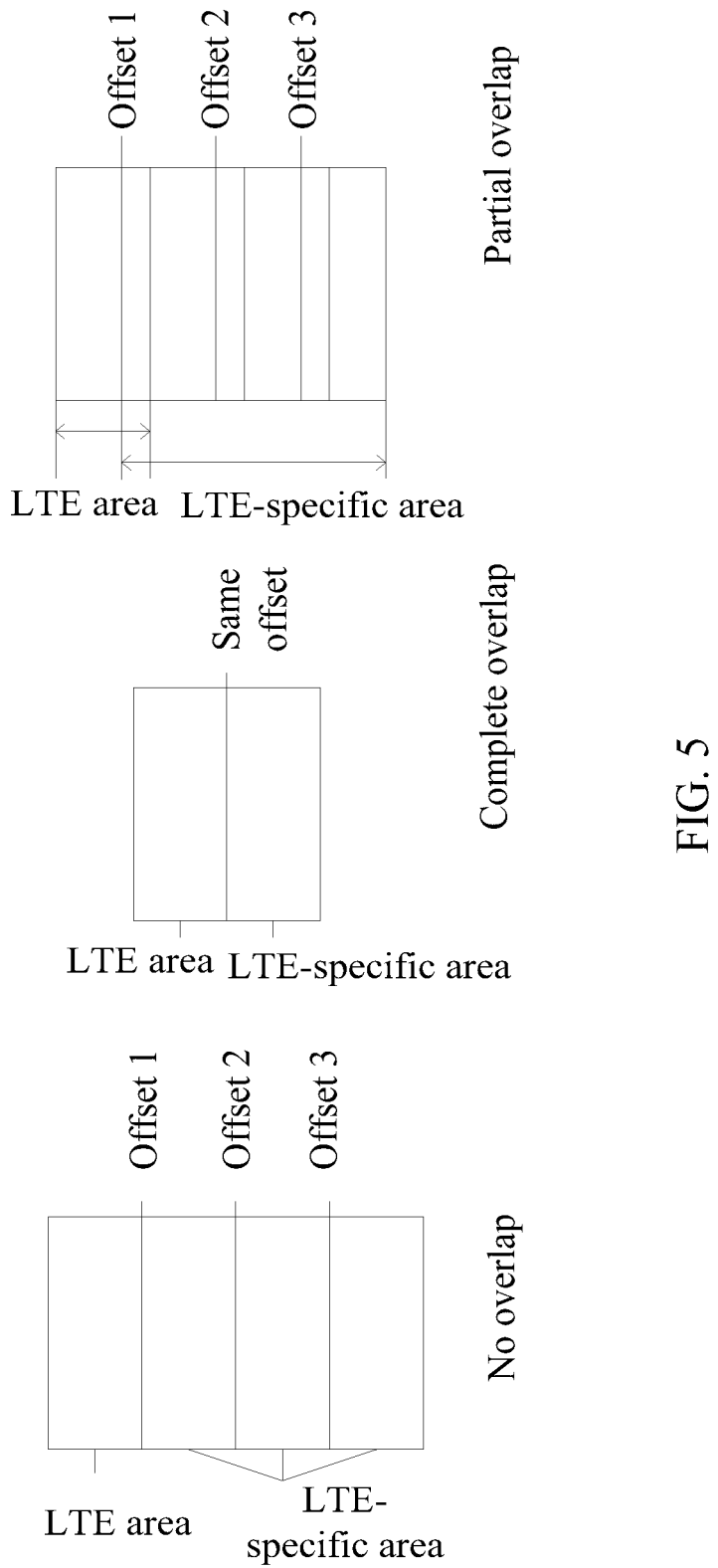
FIG. 5 shows an LTE-specific area and an LTE area in an embodiment of the present invention.

Further, in the case that the ACK/NACK channel corresponding to non-paired downlink carriers is mapped to the LTE-A-specific area, the corresponding start offset information may be introduced. As shown in FIG. 5, the start offset information divides the corresponding LTE-A-specific area into multiple LTE-A-specific subareas. Each LTE-A-specific subarea corresponds to each non-paired downlink carrier respectively, and the configuration of different start offset information makes multiple LTE-A-specific subareas not overlapped at all, or overlapped completely (all start offsets are the same), or overlapped partly. For example, the corresponding start offset information makes the ACK/NACK channel corresponding to the downlink carrier fall within the LTE area reserved by the LTE system or within the LTE-A-specific area. If the ACK/NACK channel falls within the LTE area reserved by the LTE system, the redundant ACK/NACK channel in the LTE area can be utilized efficiently, and the resources reserved in the LTE-A-specific area can be reduced.

(3) The network side sends ACK/NACK information in the allocated physical channel area, and notifies a UE of the physical channel area allocated to the UE and the network side for sending ACK/NACK messages. Meanwhile, the network side receives the ACK/NACK information sent by a UE in the physical channel area which is allocated to the UE for sending ACK/NACK information.

When the network side notifies a UE of the physical channel area allocated to the UE and the network side for sending ACK/NACK information, one bit in the PDCCH may indicate different physical channel areas, namely, indicate that the area mapped to the ACK/NACK channel is the LTE area or LTE-A-specific area. Through this bit, the UE determines the physical channel area that includes the uplink or downlink ACK/NACK channel, and determines the physical channel area that includes the ACK/NACK channel used for receiving or sending ACK/NACK information.

Figure 6:
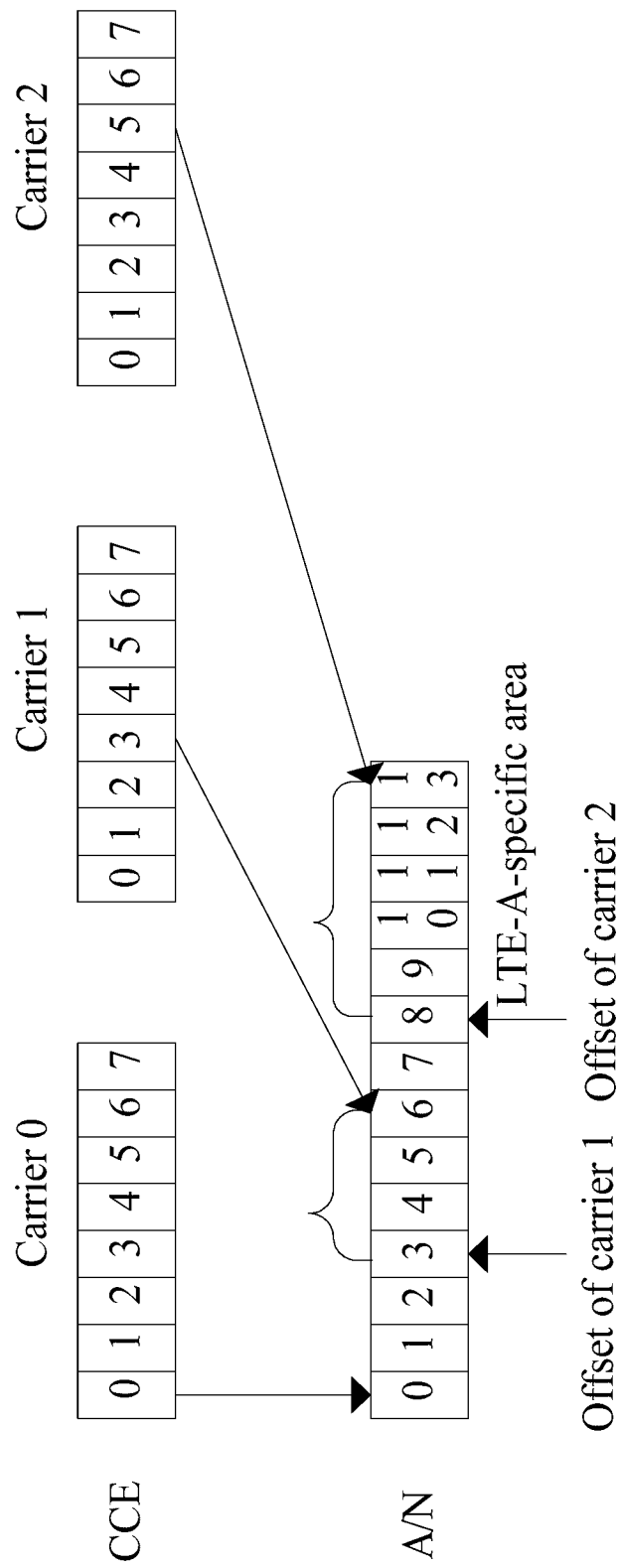
FIG. 6 is a first schematic diagram of an application instance in an embodiment of the present invention.

As shown in FIG. 6, assuming that the UE has three downlink carriers and one uplink carrier, the mapping rule for mapping of the ACK/NACK channel of the downlink carriers (paired downlink carriers) corresponding to the uplink carriers is the same as the mapping rule of the LTE system. For the mapping relations between the PDCCH and the ACK/NACK of other two downlink carriers (namely, non-paired downlink carriers), the corresponding ACK/NACK channel may be determined according to the mapping of the start offset information and the CCE sequence number of the PDCCH on the corresponding downlink carrier. The start offset information indicates that the physical channel area covering the ACK/NACK channel is an LTE area or an LTE-A-specific subarea; and the CCE sequence number indicates the location of the ACK/NACK channel in the corresponding LTE area or LTE-A-specific subarea. In addition, in the LTE-A-specific area, other mapping rules may be applied to determine the corresponding ACK/NACK channel.

Figure 7:
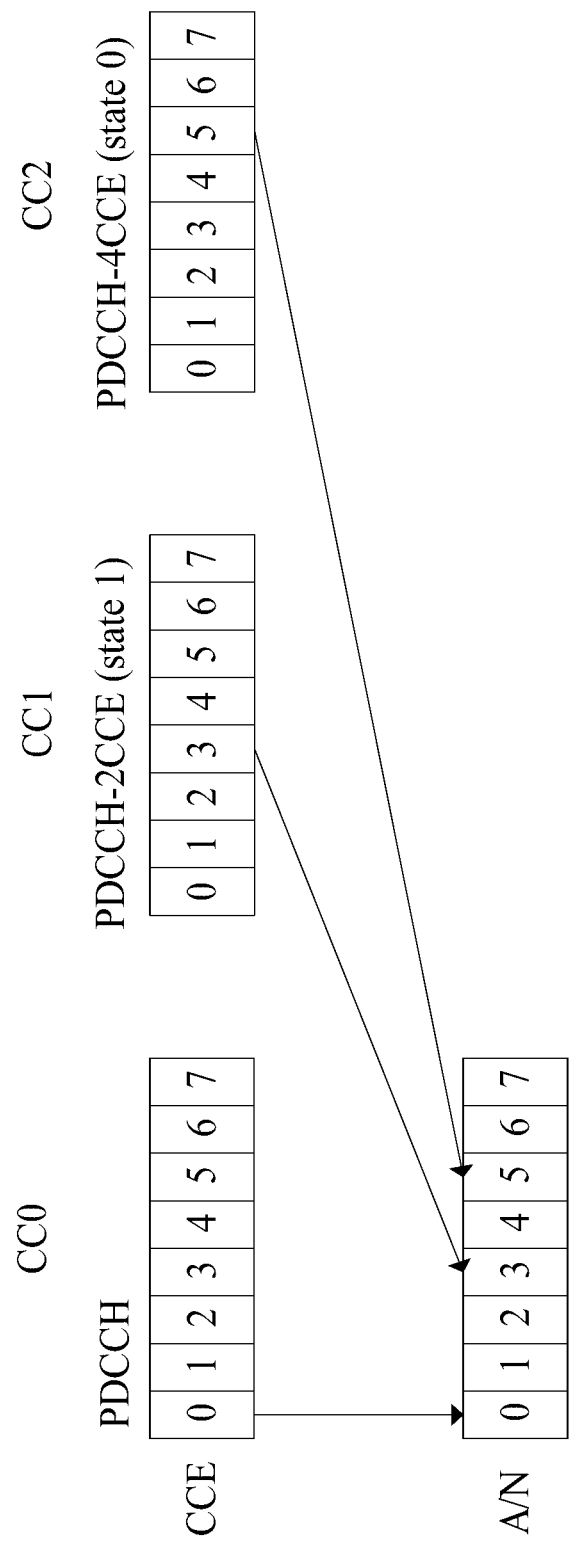
FIG. 7 is a second schematic diagram of an application instance in an embodiment of the present invention.

Further, still assuming that 1 bit is added into the PDCCH (1 bit indicates two states: state 0 and state 1), as shown in FIG. 7, the ACK/NACK channel mapping process may include:

(a) For the mapping of the ACK/NACK channel resources on the paired downlink carrier (CC0), the mapping rule of the LTE system may be applied, namely, ACK/NACK channel sequence number corresponds to the minimum CCE index of the PDCCH.

(b) For the mapping of the ACK/NACK channel resources on the non-paired downlink carriers (CC1 and CC2), a new mapping rule may be introduced, which is indicated by 1 bit in the PDCCH on the local carrier, as detailed below:

When the PDCCH on the non-paired downlink carrier is composed of 1 CCE, the ACK/NACK channel corresponds to the CCE index of the PDCCH of this downlink carrier;

When the PDCCH on the non-paired downlink carrier is composed of 2 CCEs, 1 bit in the PDCCH may indicate the positions of two ACK/NACK channels, and the ACK/NACK channels correspond to the CCE indices of the PDCCH of this downlink carrier, respectively;

When the PDCCH on the non-paired downlink carrier is composed of 4 CCEs, 1 bit in the PDCCH may indicate the positions of two ACK/NACK channels, and the ACK/NACK channels are mapped to the second CCE index and the fourth CCE index among four CCEs, which reduces the probability of conflicting with the ACK/NACK channel resource in the paired carriers; and When the PDCCH on the non-paired downlink carrier is composed of 8 CCEs, the mapping rule is the same as the scenario of 4 CCEs above. In this case, the ACK/NACK channels are mapped to two CCE indices selected, which are any two CCE indices in the second, fourth, sixth, and eighth CCE indices in the 8 CCEs.

It should be noted that: This embodiment is applicable to determining the uplink ACK/NACK channel, and applicable to dynamic indication of the downlink ACK/NACK channel. For example, 1 specific bit in the PDCCH may be used to indicate the specific mapping area of the downlink ACK/NACK channel so that the corresponding downlink ACK/NACK channel can be determined. The detailed process is similar to the foregoing process.

Further, when the network side notifies a UE of the physical channel area allocated to the UE and the network for sending ACK/NACK information, multiple bits in the PDCCH may dynamically indicate the physical channel areas that include the ACK/NACK channels. For example, two bits in the PDCCH dynamically indicate the physical channel areas that include four ACK/NACK channels.

In addition, when the network notifies the UE of the physical channel area allocated to the UE and the network side for sending ACK/NACK information, if start offset information is configured, the start offset information may be notified to the UE through an RRC signaling. For example, the corresponding start offset information is broadcast on the corresponding downlink carrier; or, all start offset information is broadcast on the paired carriers, and may be carried on the signaling that carries the reserved ACK/NACK channel resource specific to LTE-A; or, the start offset information is carried on the PDCCH, and the existing bit field represents the start offset information, for example, HARQ process, and Modulation Coding Scheme (MCS) etc.

(II) UE Receives or Sends ACK/NACK Information

A UE receives an indication of the physical channel area that is sent by the network side, and receives or sends the ACK/NACK messages according to the indication.

Specifically, a UE receives the indication sent by the network side. According to the indication, the UE determines the physical channel area allocated by the network side to the UE and the network side for sending ACK/NACK information. Then, the UE can determine the ACK/NACK channel available to the UE in the corresponding physical channel area for sending ACK/NACK information according to a mapping rule, and receive and or send ACK/NACK information through the ACK/NACK channel.

Embodiment 2

Figure 8:
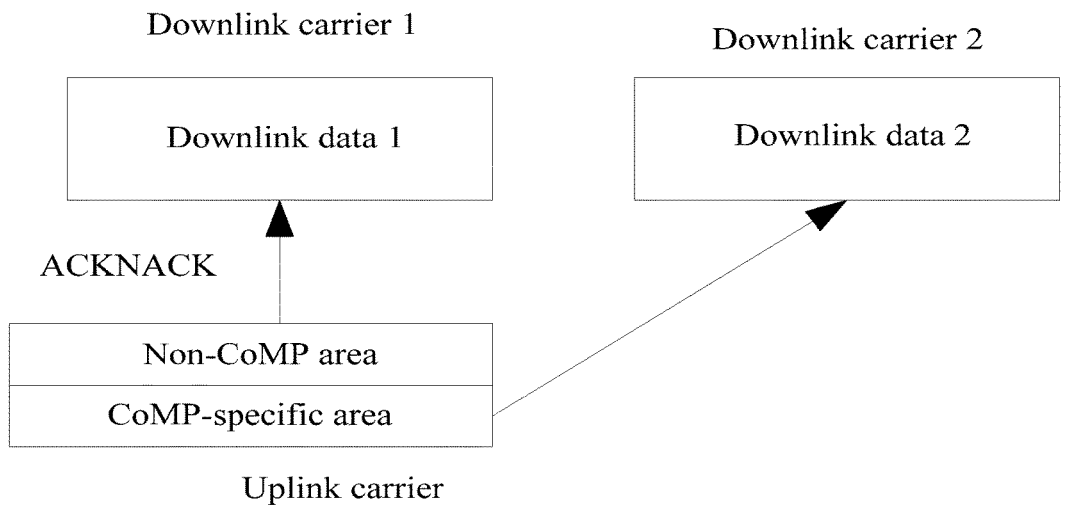
FIG. 8 shows a scenario of crossed ACK/NACK mapping in an embodiment of the present invention.
Figure 9:
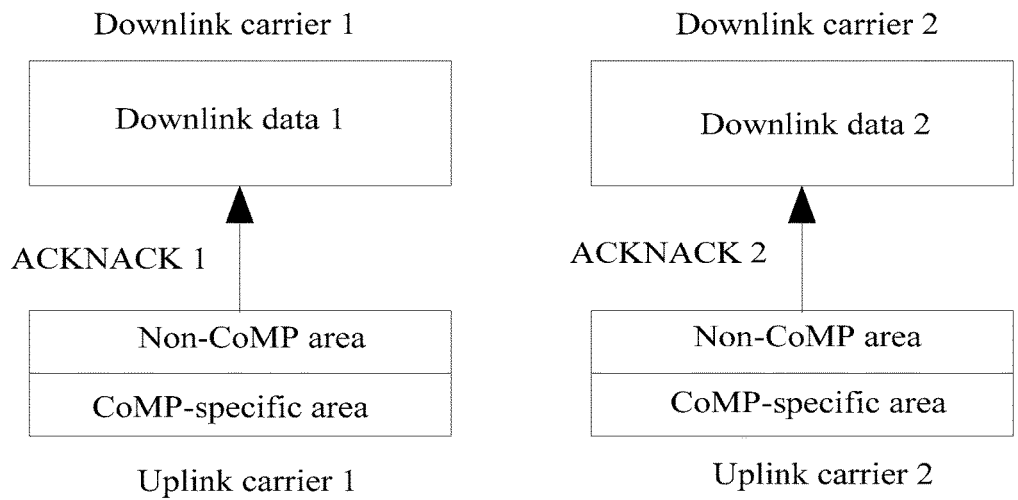
FIG. 9 shows a scenario of non-crossed ACK/NACK mapping in an embodiment of the present invention.

The method of dynamically notifying the area mapped to the ACK/NACK channel in the first embodiment above may be extended so that the method is applicable to send ACK/NACK information in a CoMP system. The corresponding physical channel areas in the CoMP system include CoMP areas and non-CoMP areas. As shown in FIG. 8, a CoMP area is applicable to a scenario of crossed ACK/NACK mapping, and applicable to a scenario of non-crossed ACK/NACK mapping as shown in FIG. 9. That is, in the ACK/NACK mapping of paired downlink carriers, non-CoMP areas or CoMP areas may be selected dynamically.

After the method applied to the CoMP system, as regards how the network side allocates ACK/NACK channel resources and receives or sends ACK/NACK information, and how a UE receives or sends ACK/NACK information, the processes are similar to those described in the first embodiment above, and therefore are not described again.

Embodiment 3

The third embodiment deals with a scenario of ACK/NACK channel indication among multiple subframes. That is, the third embodiment accomplishes flexible indication of ACK/NACK channels among multiple subframes, and overcomes conflict.

Specifically, assuming there are 3 downlink carriers and 1 uplink carrier; the PDCCH may include 1 bit which indicates the ACK/NACK channels between two subframes.

Figure 10:
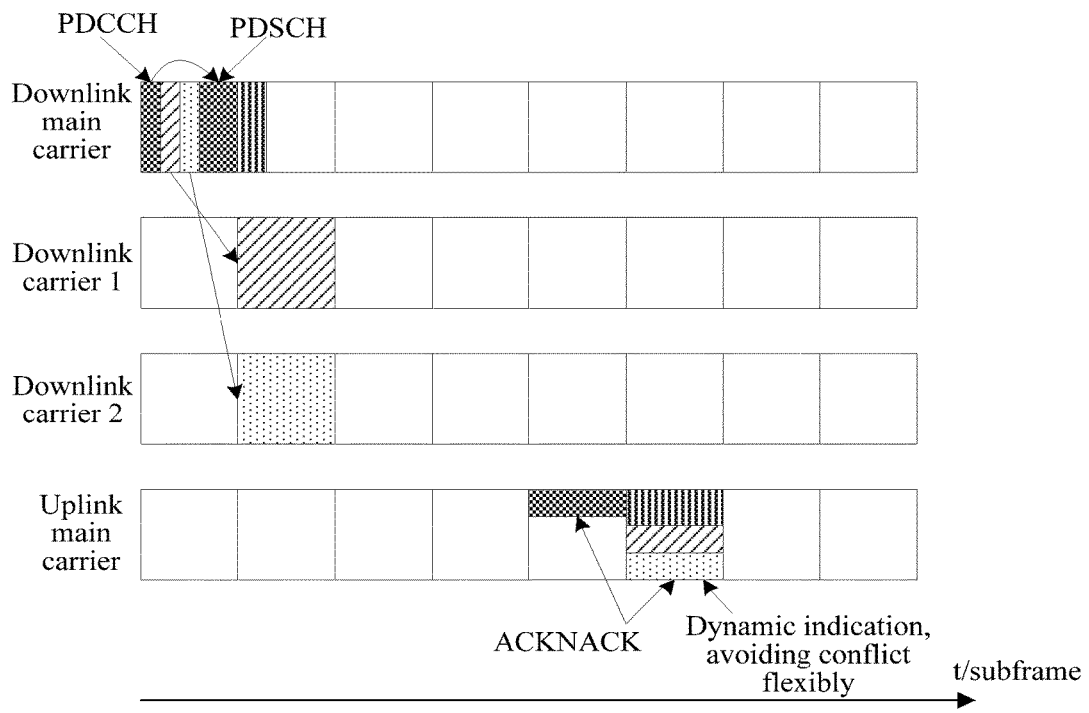
FIG. 10 is a third schematic diagram of an application instance in an embodiment of the present invention.

For example, as shown in FIG. 10, all PDCCHs of a UE (in FIG. 10, it is assumed there are 3 PDCCHs) are carried on a downlink carrier (such as downlink main carrier). The data of the current subframe may be in the subframe of the PDCCH, but the data of other carriers indicated and the corresponding PDCCH need to be deferred for one subframe, which is shown by the arrow in downlink carrier 1 and downlink carrier 2 in FIG. 10; and the uplink ACK/NACK messages are fed back on the 4th subframe after the corresponding data channel.

In the foregoing process, the PDCCHs of the same UE are transmitted on the same subframe, but the uplink ACK/NACK channel feeds back information on different subframes. Consequently, the ACK/NACK corresponding to the PDCCH of the next subframe may conflict.

To overcome the conflict, an LTE-A-specific area may be reserved on the uplink subframe. Through the indication mode in the processing solution provided herein (for example, indication mode described in the first embodiment), the positions of the ACK/NACK channels are notified to the UE. That is, the positions of the ACK/NACK channels in the LTE area or LTE-A-specific area are indicated.

In the embodiments of the present invention, because LTE-A-specific area is introduced, the ACK/NACK information corresponding to the non-paired uplink carriers or non-paired downlink carriers can be fed back, a tradeoff is achieved between the ACK/NACK resource reservation overhead and ACK/NACK resource mapping conflict, and the ACK/NACK performance loss caused by interference between cells is reduced. Meanwhile, start offset information is introduced so that the ACK/NACK channel resources can be scheduled more flexibly. For example, when the Control Format Indication (CFI) value of the paired downlink carriers is small, the start offset information may make the physical channel area fall within the LTE area. In this way, the redundant ACK/NACK channel in the LTE area can be utilized efficiently, the resources reserved in the LTE-A-specific area can be reduced, and the utilization ratio of the ACK/NACK channel is improved. In the embodiments of the present invention, the LTE-A-specific area includes the ACK/NACK channel corresponding to the CCE in the public search space, which further improves the utilization ratio of the ACK/NACK channel. In the embodiments of the present invention, an LTE-A-specific area (or LTE-A-specific subarea) can be reserved for each non-paired downlink carrier of a user respectively to reduce conflict of the ACK/NACK channel. In the embodiments of the present invention, through allocation of different physical channel areas, the ACK/NACK resources can be dynamically released for the sake of transmitting data. For example, when there are few users of LTE, or when the LTE area has considerable redundancy, the ACK/NACK channel can be mapped to the LTE area through dynamic adjustment. In this case, the reserved LTE-A-specific area resources can be released and become available to data channel transmission.

Persons of ordinary skill in the art should understand that all or part of the steps of the method provided in the embodiments above may be implemented by a program instructing relevant hardware. The program may be stored in computer readable storage media. When the program runs, the steps of the method specified in any embodiment above are executed. The storage media may be a magnetic disk, CD-ROM, Read-Only Memory (ROM), or Random Access Memory (RAM).

Figure 11:
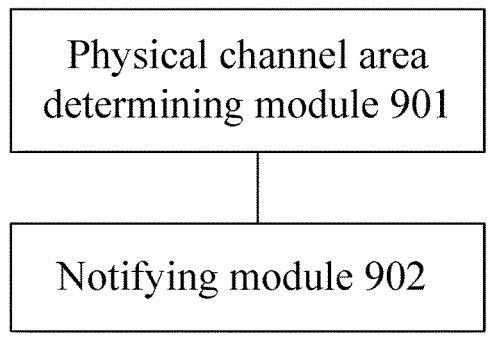
FIG. 11 shows an apparatus for allocating ACK/NACK channel resources in an embodiment of the present invention.

An apparatus for allocating channel resources is provided in an embodiment of the present invention. The apparatus may be configured on the network side, for example, in a Base Station. As shown in FIG. 11, the apparatus may include:

a physical channel area determining module 901, configured to determine one physical channel area among multiple physical channel areas to be used by an ACK/NACK channel, namely, select a physical channel area to be used by an ACK/NACK channel among multiple physical channel areas, where the physical channel area may be an uplink physical channel area or downlink physical channel area; and a notifying module 902, configured to notify a UE of the physical channel area determined by the physical channel area determining module 901 so that the UE can determine the channel available for receiving or sending ACK/NACK information in the physical channel area according to a predefined mapping rule, where the detailed notification method may be but is not limited to: notifying the UE of the corresponding physical channel area through L1/L2 signaling or RRC signaling.

The physical channel areas in the physical channel area information sent by the notifying module 902 may include LTE areas and LTE-A-specific areas. The LTE-A-specific areas may include multiple LTE-A-specific subareas, and the LTE-A-specific areas may include the ACK/NACK channels corresponding to the CCE of the public search space in the LTE system; or, the physical channel areas may include COMP areas and non-COMP areas.

The notification method of the notifying module 902 may be but is not limited to: One or more bits in the PDCCH indicates the physical channel area in which the UE receives or sends ACK/NACK messages; or, different scrambling codes loaded on the PDCCH indicate the physical channel area in which the UE receives or sends ACK/NACK messages.

In this apparatus, the notifying module 902 may be configured to send start offset information to the UE through an RRC signaling. The corresponding start offset information may be configured to determine the start point of a physical channel area. According to a predefined mapping rule, the start offset information may be combined with a CCE sequence number to indicate the channel used by the UE for receiving or sending ACK/NACK information among multiple channels included in the physical channel area in which the UE receives or sends ACK/NACK information.

In this embodiment, the apparatus may further include a physical channel area allocating module, which is configured to allocate at least one first physical channel area and at least one second physical channel area. The first physical channel area includes a confirmation information channel for sending confirmation information of paired carriers, and the second physical channel area includes a confirmation information channel for sending confirmation information of non-paired carriers.

Figure 12:
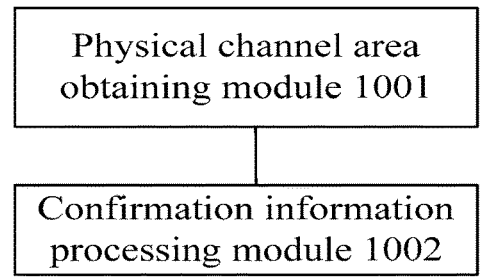
FIG. 12 shows an apparatus for processing confirmation information in a UE in an embodiment of the present invention.

An apparatus for processing confirmation information is provided in an embodiment of the present invention. The apparatus may be configured in a UE. As shown in FIG. 12, the apparatus may include a physical channel area obtaining module and a confirmation information processing module.

(1) The physical channel area obtaining module 1001 is configured to obtain a physical channel area indication. The indication indicates the physical channel area that includes a ACK/NACK channel in multiple physical channel areas. The physical channel area may be a physical channel area that includes an uplink ACK/NACK channel, or a physical channel area that includes a downlink ACK/NACK channel. The physical channel area obtaining module 1001 may receive the physical channel area indication sent by the network side through L1/L2 signaling or RRC signaling.

The physical channel area obtaining module 1001 may obtain the physical channel area indication of the ACK/NACK channel through one or more bits in the PDCCH; or obtain the physical channel area indication of the ACK/NACK channel through a scrambling code in the PDCCH; or obtain the physical channel area indication by other means.

(2) The confirmation information processing module 1002 is configured to send or receive ACK/NACK information on the physical channel area that includes the ACK/NACK channel according to the physical channel area indication obtained by the physical channel area obtaining module 1001.

The confirmation information processing module 1002 is further configured to determine a channel in the physical channel area to be used by the ACK/NACK channel, and specifically, determine the channel available for receiving or sending ACK/NACK information in multiple channels included in different LTE-A-specific subareas or LTE areas according to different mapping rule.

In this apparatus, the corresponding physical channel areas include LTE areas and LTE-A-specific areas, or include CoMP areas and non-CoMP areas. Further, the LTE-A-specific areas include multiple LTE-A-specific subareas, and the LTE-A-specific area may include a ACK/NACK channel corresponding to the CCE of the public search space in the LTE system.

Figure 13:
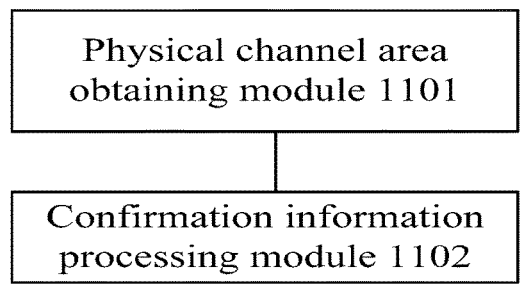
FIG. 13 shows an apparatus for processing confirmation information on a network side in an embodiment of the present invention.

Another apparatus for processing confirmation information is provided in an embodiment of the present invention. The apparatus may be configured on the network side, for example, set in a Base Station. As shown in FIG. 13, the apparatus may include a physical channel area obtaining module 1101 and a confirmation information processing module 1102.

(1) The physical channel area obtaining module 1101 is configured to obtain a physical channel area indication. The indication indicates the physical channel area that includes a ACK/NACK channel in multiple physical channel areas. The physical channel area may be a physical channel area that includes an uplink ACK/NACK channel, or a physical channel area that includes a downlink ACK/NACK channel. The physical channel area obtaining module 1101 may obtain the physical channel area indication locally.

(2) The confirmation information processing module 1102 is configured to send or receive ACK/NACK information on the physical channel area that includes the ACK/NACK channel according to the physical channel area indication obtained by the physical channel area obtaining module 1101.

The confirmation information processing module 1102 is further configured to determine a channel in the physical channel area to be used by the ACK/NACK channel, and specifically, determine a channel available for receiving or sending ACK/NACK information in multiple channels included in different LTE-A-specific subareas or LTE areas according to different mapping rule.

In this apparatus, the corresponding physical channel areas include LTE areas and LTE-A-specific areas, or include CoMP areas and non-CoMP areas. Further, the LTE-A-specific areas include multiple LTE-A-specific subareas, and the LTE-A-specific area may include ACK/NACK channels corresponding to the CCEs of the public search space in the LTE system.

Figure 14:
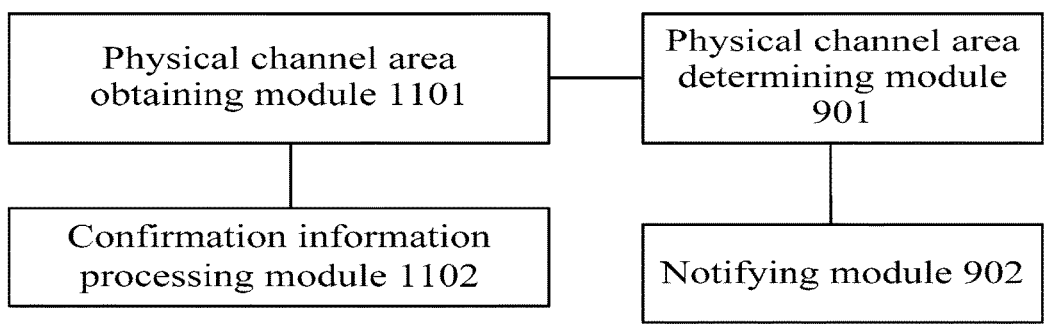
FIG. 14 shows a structure of a BS provided in an embodiment of the present invention.

A Base Station is provided in an embodiment of the present invention. As shown in FIG. 14, the BS may include the physical channel area determining module 901, notifying module 902, physical channel area obtaining module 1101, and confirmation information processing module 1102. The physical channel area obtaining module 1101 obtains the physical channel area indication determined by the physical channel area determining module 901. The functions of the modules have been described above, and are not repeated here any further.

Through the apparatus for allocating channel resources and the apparatus for processing confirmation information above, the ACK/NACK information corresponding to the non-paired uplink carrier or downlink carrier can be fed back, the utilization ratio of a ACK/NACK channel is improved, the flexibility of scheduling ACK/NACK resources is improved, and the probability of conflict generated by ACK/NACK channels is reduced.

The above descriptions are merely exemplary embodiments of the present invention, but not intended to limit the protection scope of the present invention. Any modifications, variations or replacement that can be easily derived by those skilled in the art shall fall within the protection scope of the present invention. Therefore, the protection scope of the present invention is subject to the appended claims.

What is claimed is:

1. A method comprising:
   receiving, by a user equipment from a base station, a physical downlink control channel (PDCCH), wherein the PDCCH indicates a resource for carrying a physical downlink shared channel (PDSCH) on a downlink carrier of at least two downlink carriers and indicates a first physical uplink control channel (PUCCH) area or a second PUCCH area for the PDSCH, wherein at least one of the PUCCH areas comprises at least two PUCCH resources, wherein the first PUCCH area is for carrying ACK/NACK information in a long term evolution (LTE) system, and the second area is for carrying ACK/NACK information in a LTE-A system compatible with the LTE system;
   receiving, by the user equipment from the base station, the PDSCH on the downlink carrier of the at least two downlink carriers; and
   transmitting, by the user equipment to the base station on a PUCCH resource in the one PUCCH area, acknowledgement or non-acknowledgement (ACK/NACK) in response to the PDSCH.

2. The method according to claim 1, further comprising:
   determining, by the user equipment, the PUCCH resource in the indicated PUCCH area according to a mapping rule that determines a PUCCH resource for transmitting ACK/NACK information in a PUCCH area.

3. The method according to claim 2, wherein the first area and the second area correspond to different mapping rules.

4. The method according to claim 3, wherein one mapping rule in the different mapping rules determines the PUCCH resource by a start offset information combined with a sequence number of a control channel element (CCE).

5. The method according to claim 1, wherein the PUCCH first area and the second PUCCH area do not overlap or partially overlap.

6. An apparatus comprising:
a storage medium including executable instructions; and
a processor;
wherein the executable instructions, when executed by the processor, cause the processor to:
obtain a physical downlink control channel (PDCCH) received from a base station, wherein the PDCCH indicates a resource for carrying a physical downlink shared channel (PDSCH) on a downlink carrier of at least two downlink carriers and indicates a first physical uplink control channel (PUCCH) area or a second PUCCH area for the PDSCH, wherein at least one of the PUCCH areas comprises at least two PUCCH resources, wherein the first PUCCH area is for carrying ACK/NACK information in a long term evolution (LTE) system, and the second area is for carrying ACK/NACK information in a LTE-A system compatible with the LTE system;
obtain the PDSCH received from the base station on the downlink carrier of the at least two downlink carriers; and
determine acknowledgement or non-acknowledgement (ACK/NACK), on a PUCCH resource in the one PUCCH area, in response to the PDSCH.

7. The apparatus according to claim 6, wherein the executable instructions, when executed by the processor, further causes the processor to:
determine the PUCCH resource in the indicated PUCCH area according to a mapping rule, wherein the mapping rule determines a PUCCH resource for transmitting ACK/NACK information in a PUCCH area.

8. The apparatus according to claim 7, wherein the first area and the second area correspond to different mapping rules.

9. The apparatus according to claim 6, wherein the first PUCCH area and the second PUCCH area do not overlap or partially overlap.

10. A user equipment comprising:
a transmitter,
a receiver, and
a processor coupled to the transmitter and the receiver, wherein the receiver is configured to:
receive, from a base station, a physical downlink control channel (PDCCH), wherein the PDCCH indicates a resource for carrying a physical downlink shared channel (PDSCH) on a downlink carrier of at least two downlink carriers and indicates a first physical uplink control channel (PUCCH) area or a second PUCCH area for the PDSCH, wherein at least one of the PUCCH areas comprises at least two PUCCH resources, wherein the first PUCCH area is for carrying ACK/NACK information in a long term evolution (LTE) system, and the second area is for carrying ACK/NACK information in a LTE-A system compatible with the LTE system; and
receive, from the base station, the PDSCH on the downlink carrier of the at least two downlink carriers;
the processor is configured to: determine acknowledgement or non-acknowledgement (ACK/NACK) in response to the PDSCH; and
the transmitter is configured to: transmit, to the base station on a PUCCH resource in the one PUCCH area, the ACK/NACK in response to the PDSCH.

11. The user equipment according to claim 10, wherein the processor is configured to determine the PUCCH resource in the indicated PUCCH area according to a mapping rule that determines a PUCCH resource for transmitting ACK/NACK information in a PUCCH area.

12. The user equipment according to claim 11, wherein the first area and the second area correspond to different mapping rules.

13. The user equipment according to claim 12, wherein one mapping rule in the different mapping rules determines the PUCCH resource by a start offset information combined with a sequence number of a control channel element (CCE).

14. The user equipment according to claim 10, wherein the first area and the second area do not overlap or partially overlap.

* * * * *

UNITED STATES PATENT AND TRADEMARK OFFICE
CERTIFICATE OF CORRECTION

PATENT NO. : 9,768,937 B2
APPLICATION NO. : 15/130678
DATED : September 19, 2017
INVENTOR(S) : Lei Guan et al.

It is certified that error appears in the above-identified patent and that said Letters Patent is hereby corrected as shown below:

On the Title Page

Item (56) References Cited, Other Publications, Last reference should read:

-- "3$^{rd}$ Generation Partnership Project; Technical Specification Group Radio Access Network; Evolved Universal Terrestrial Radio Access (E-UTRA); Multiplexing and channel coding (Release 8)," 3GPP TS 36.212, V8.5.0, pp. 1-58, 3$^{rd}$ Generation Partnership Project, Valbonne, France (December 2008). --

Signed and Sealed this
Twelfth Day of June, 2018

Andrei Iancu
*Director of the United States Patent and Trademark Office*